United States Patent [19]

Mine et al.

[11] Patent Number: 4,882,631
[45] Date of Patent: Nov. 21, 1989

[54] IMAGE READING DEVICE

[75] Inventors: Kazunori Mine; Keisuke Murakami; Hiromasa Urata, all of Shizuoka, Japan

[73] Assignee: Tokyo Electric Co., Ltd., Tokyo, Japan

[21] Appl. No.: 268,451

[22] Filed: Nov. 8, 1988

[30] Foreign Application Priority Data

Nov. 10, 1987 [JP] Japan ................................. 62-283696

[51] Int. Cl.[4] .............................................. H04N 1/12
[52] U.S. Cl. ...................................... 358/471; 358/494
[58] Field of Search ........................ 358/293, 294, 285

[56] References Cited

U.S. PATENT DOCUMENTS

| 4,439,790 | 3/1984 | Yoshida | 358/294 |
| 4,459,619 | 7/1984 | Yoshida | 358/293 |
| 4,465,939 | 8/1984 | Tamura | 358/294 |
| 4,724,330 | 2/1988 | Tuhro | 358/294 |

FOREIGN PATENT DOCUMENTS 60-116560 8/1985 Japan .

Primary Examiner—Howard W. Britton
Attorney, Agent, or Firm—Frishauf, Holtz, Goodman & Woodward

[57] ABSTRACT

An image reading device comprises an original table having a surface area defined as a reading section, a black mark, a carrier driven towards the reading section across the mark in the sub-scanning direction, a fluorescent light for illuminating the original and mark, and an image sensor fixed on the carrier and having a plurality of light receiving elements arranged in a line to read the image in the main scanning direction. In this image reading device, the mark is formed of a triangle which has a first side extending in the sub-scanning direction and a second side extending from the first side towards the original table at an angle with respect to the first side smaller than an angle made between the first side and the main scanning direction, and a reading control circuit is provided to detect that black picture element data is output from at least a preset number of successive light receiving elements while the image sensor is being moved by the movement of the carrier to pass across the mark, and setting the reading starting position in the main scanning direction by using, as a reference position, the position of the light receiving element which corresponds to the second side of the mark and is included in the light receiving elements which output the image data.

6 Claims, 7 Drawing Sheets

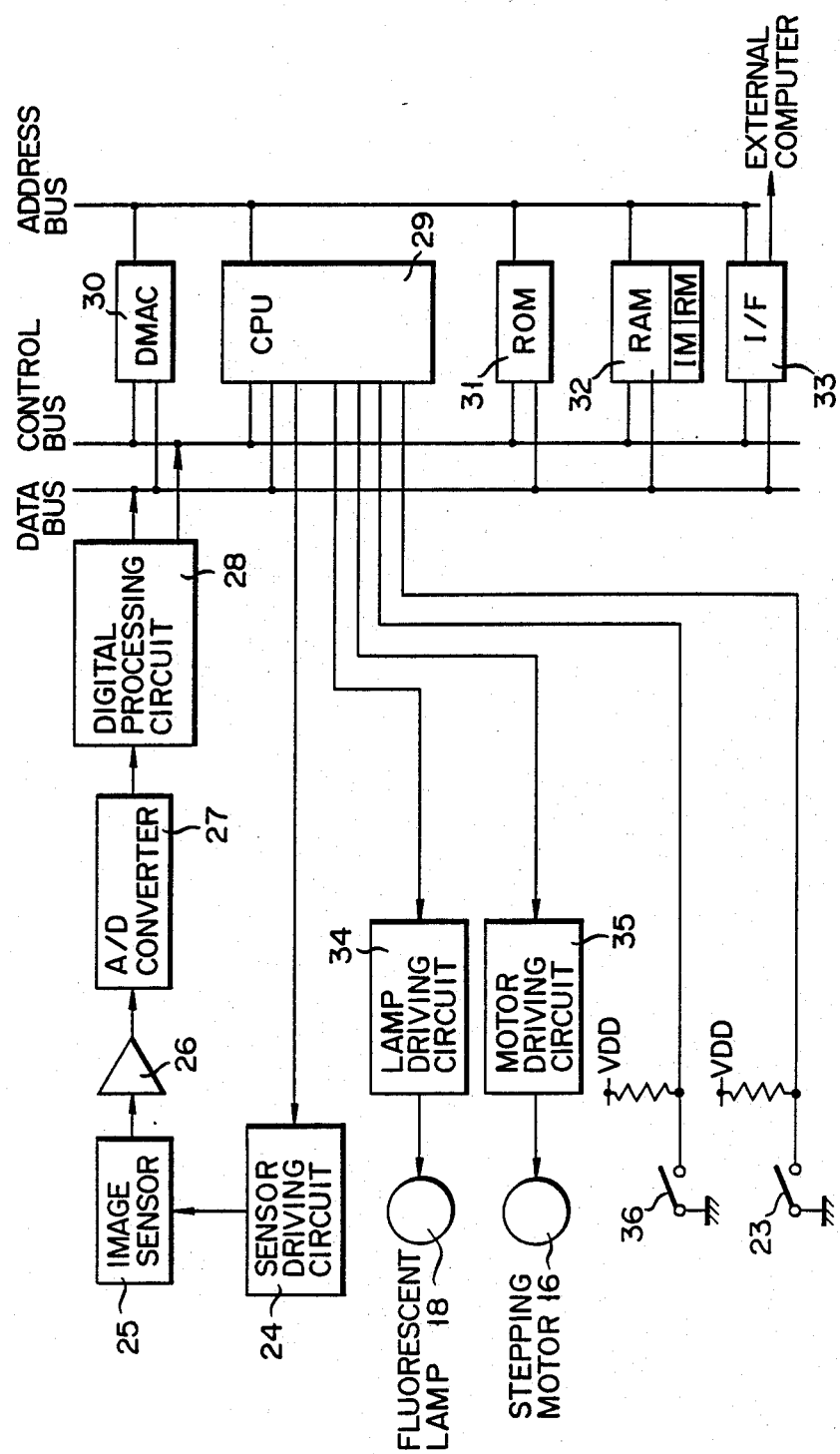
F I G. 7

IMAGE READING DEVICE

BACKGROUND OF THE INVENTION

1. Field of the Invention

This invention relates to an image reading device, and more particularly to an image reading device for optically reading the image of an original placed on a original table.

2. Description of the Related Art

In this type of image reading device, an original is put on a transparent original table and positioned in the reading area or reading section of the original table. The image of the original is illuminated by means of a light source provided below the original table and is read according to the amount of light reflected on the surface of the original. In a case where a line type image sensor having a plurality of light receiving elements arranged in a row is used to read the image, the image sensor is mounted on a carrier which is movable in the lengthwise direction (or subscanning direction) of the reading section with the line of light receiving elements being placed in parallel with a line extending in the width direction (or main scanning direction) of the reading section. In the image reading mode, the carrier is first set near one end of the original table, and is then driven to cross the reading section of the original table. The image sensor causes the plurality of light receiving elements to effect the sensing operation each time the carrier moves a preset distance, picture element data of one line are serially output in the order from one end of the line of light receiving elements to the other end thereof. All the image of the original is converted into picture element data while the image sensor is moving across the reading section, and is then stored into a memory of the image reading device.

In the prior art image reading device, limit switch 102 as is shown in FIG. 1 is used, for example, to set the position at which the operation of reading the image of the original is started. When the carrier is moved back as indicated by arrow A to come into contact with limit switch 102 mounted near one end of the original table, a detection signal is generated from limit switch 102. The image reading device sets the reading starting position in response to the detection signal with the present position of the carrier set as a reference position. That is, the reading starting position is set at a position of the image sensor which is set when the carrier is moved forward by distance L as shown by arrow B from the present position. Picture element data output from the image sensor is made effective as the picture element data of the original image after the image sensor has reached the reading starting position. Distance L is previously determined to be equal to the interval between the reading section and the image sensor with the carrier set in contact with limit switch 102. Therefore, if the present position of the carrier can be precisely detected by means of limit switch 102, the front end position of the reading section coincides with the reading starting position.

However, limit switch 102 has the following defects. That is, the mounting position of limit switch 102 may vary in the manufacturing process of the image reading device, and the mechanical operation of limit switch 102 tends to be delayed. If the present position of carrier 104 cannot be precisely detected, the reading starting position in the sub-scanning direction does not coincide with the front end position of reading section 101. In this case, image other than that of the original may be read.

In another type of image reading device, narrow rectangular mark 103 as shown in FIG. 2 may be used to set the reading starting position of the original image. Mark 103 has first and second long sides extending in the main scanning direction, a first short side set in the same position as the first long side of the reading section in the main scanning direction and extending in the sub-scanning direction, and a second short side set between the first and second long sides of the reading section in the main scanning direction and extending in the sub-scanning direction. Mark 103 is detected by means of the image sensor while the carrier is moved forwardly to the reading section as shown by narrow B after it has been moved back as indicated by arrow A. The image reading device sets the reading starting position in the sub-scanning direction by setting the present position of the carrier as a reference position when mark 103 is detected. Further, it sets the position of the first short side of mark 103 to the reading starting position in the main scanning direction. The reading starting position in the sub-scanning direction is set at the position of the image sensor which is set when the carrier is moved by preset distance L in a direction indicated by arrow B from the present position in the same manner as in the prior art case. That is, if mark 103 is precisely detected, the front end position of the reading section can be set to coincide with reading starting position in the sub-scanning direction. Further, if the first short side of mark 103 is precisely detected, the position of the first long side of the reading section can be set to coincide with the reading starting position in the main scanning direction. In this case, the image reading device derives, as effective picture element data of the original image, picture element data which is included in the picture element data output from the image sensor after the image sensor has reached the reading starting position and which is output from the light receiving elements of a preset number corresponding to the width of the reading section.

Now, the operation of the detecting mark 103 is explained with reference to FIG. 3A. Image sensor 105 reads the image of one line each time carrier 104 is moved by a preset distance. For this reason, main scanning lines P1, P2, P3 - - - are placed at a regular interval in FIG. 3A. When image sensor 105 has reached a position corresponding to main scanning lines P5, picture element data indicating the color of mark 103, for example, black is output from a preset number of or more successive light receiving elements. When mark 103 is detected by such picture element data, the reading starting position in the sub-scanning direction is set to a position of main scanning line Pi which is placed at distance L from main scanning line P5 in the forward direction. At the same time, the reading starting position in the main scanning direction is set to a position of that one of the line of successive light receiving elements which corresponds to one end position X of mark 103.

The mounting position of parts of the image reading device may vary in the manufacturing process and may be displaced due to vibration of the device occurring in operation. For example, where image sensor 105 is mounted at an angle with respect to the main scanning direction, main scanning lines P1, P2, P3 - - - may be set to extend in a right upper direction as shown in FIG. 3B or in a right lower direction as shown in FIG. 3C. In the case of FIG. 3B, the reading starting position in the main scanning direction will be erroneously set to position X'. Likewise, in the case of FIG. 3C, the reading starting position in the sub-scanning direction will be erroneously set to a position separated by distance L from main scanning line P4 in a forward direction. In particular, the reading starting position in the main scanning direction may significantly vary with the slightest inclination of image sensor 105. For this reason, it is impossible to disregard the setting error of the reading starting position in the main scanning direction.

SUMMARY OF THE INVENTION

An object of this invention is to provide a highly reliable image reading device in which the reading starting position can be correctly set.

The object can be attained by an image reading device which comprises an original table having a surface area defined as a reading section for reading the image of the original; a mark positioned adjacent to one end of the original table in the lengthwise direction of the reading section and having a light reflection factor different from that of the surroundings, the mark having a first side extending in a sub-scanning direction which is substantially the same as the lengthwise direction of the reading section and a second side extending from the first side towards the reading section at an angle with respect to the first side smaller than an angle made between the first side and a main scanning direction which is substantially the same as the width direction of the reading section; a carrier driven towards the reading section across the mark in the sub-scanning direction; a lamp for illuminating the original and mark; an image sensor fixed on the carrier and having a plurality of light receiving elements arranged in a line to read the image in the main scanning direction; and a reading control circuit for detecting that image data corresponding to the light reflection factor of the mark is output from a preset number of or more successive light receiving elements while the image sensor is being moved by the movement of the carrier to pass across the mark, and setting the reading starting position in the main scanning direction by using, as a reference position, the position of the light receiving element corresponding to the second side of the mark and included in the light receiving elements which output the image data.

In the above image reading device, the number of the light receiving elements which output the image data corresponding to the light reflection factor of the mark is in inverse proportion to the distance between the image sensor and reading section. Therefore, the carrier position detected when the mark is detected may be prevented from varying for each scanning operation. The second side of the mark is crossed by the image sensor without fail even when the image sensor crosses the mark at an inclination angle due to the mounting error. Thus, the reading starting position in the main scanning direction can be prevented from being erroneously set.

BRIEF DESCRIPTION OF THE DRAWINGS

FIG. 7 is a block diagram of a circuit of the image reading device shown in FIG. 4;

DETAILED DESCRIPTION OF THE PREFERRED EMBODIMENTS

Figure 1:
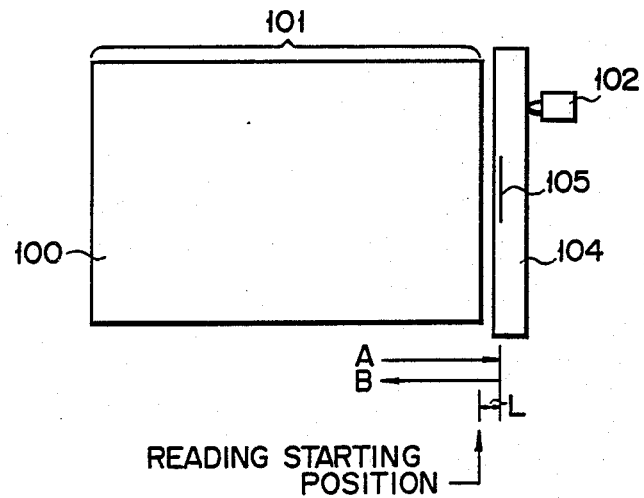
FIG. 1 is a diagram schematically showing a prior art image reading device using a limit switch for setting the reading starting position.
Figure 2:
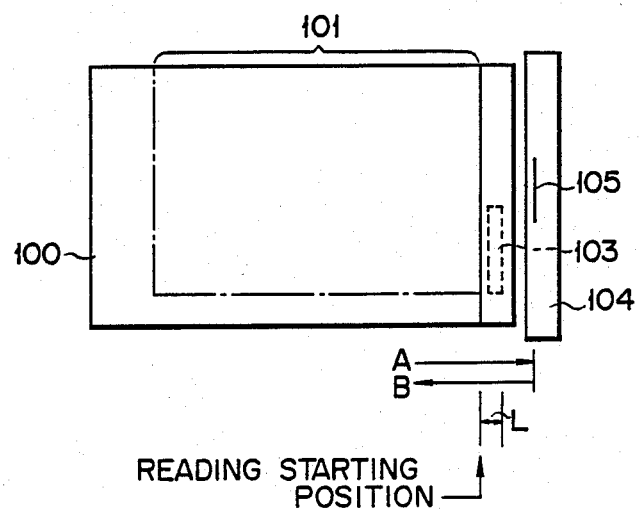
FIG. 2 is a diagram schematically showing another prior art image reading device using a rectangular mark for setting the reading starting position.
Figure 3A:
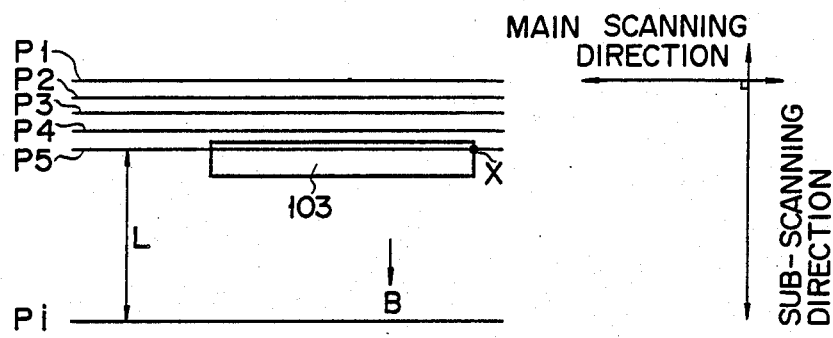
FIGS. 3A to 3C are diagrams showing the operation of detecting the mark shown in FIG. 2.
Figure 3B:
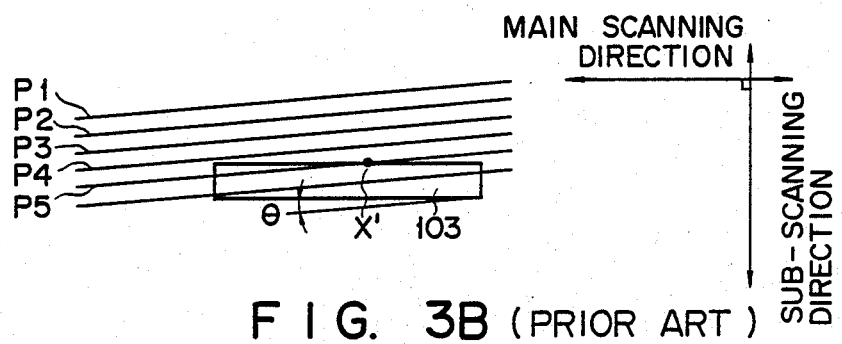
Figure 3C:
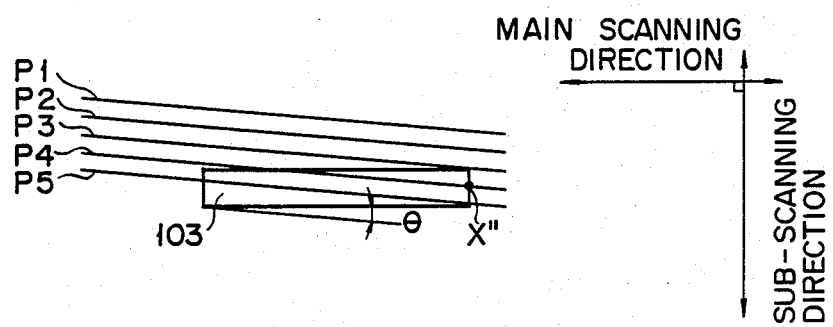
Figure 4:
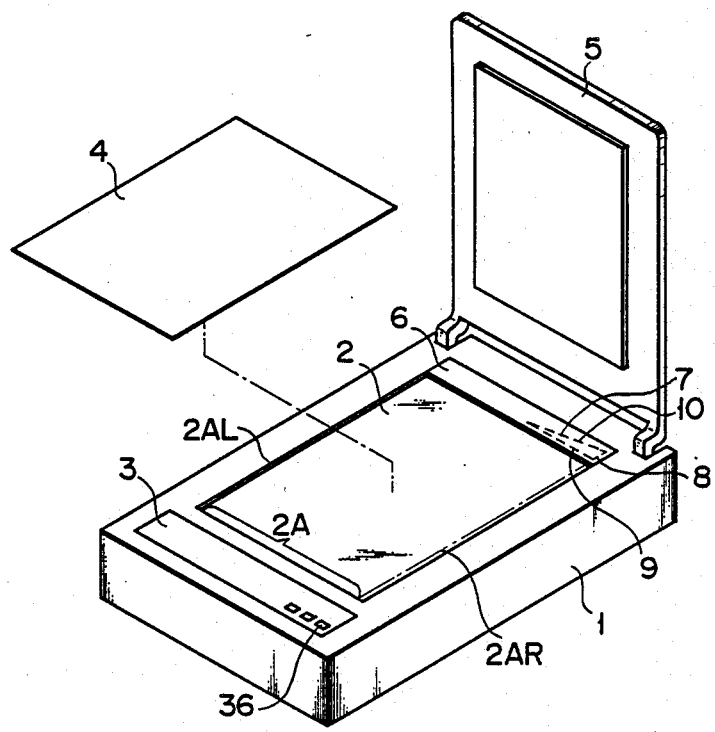
FIG. 4 is a perspective view of an image reading device according to one embodiment of this invention.

Now, an image reading device according to one embodiment of this invention is explained with reference to FIGS. 4 to 9C. FIG. 4 shows the appearance of the image reading device. The image reading device includes casing 1, original table 2, operation panel 3, original holding member 5 and positioning plate 6. Original table 2 is formed of a transparent glass, and part of the surface area thereof is defined as reading section 2A for reading the image of the original. Original holding member 5 is mounted on casing 1 so as to be freely opened and closed, and positioning plate 6 is arranged adjacent to one end of original table 2 in the lengthwise direction of reading section 2A. When original 4 is set on original table 2 in contact with positioning plate 6, original 4 is correctly positioned in reading section 2A.

Figure 5:
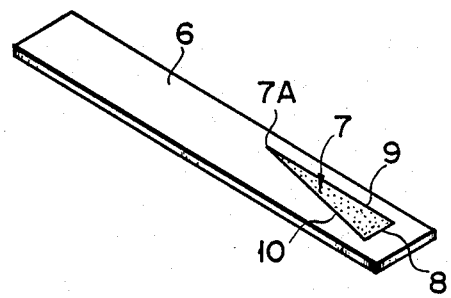
FIG. 5 is a perspective view of a positioning plate having the mark on the back surface thereof and used in the device of FIG. 4.

FIG. 5 shows mark 7 formed on the back surface of positioning plate 6. Mark 7 has first to third sides 8 to 10 constituting a right angled triangle. First and second sides 8 and 9 intersect with each other at right angles and respectively extend in the sub-scanning direction which is the same as the lengthwise direction of reading section 2A and in the main scanning direction which is the same as the width direction of reading section 2A. First side 8 is placed in the same position in the main scanning direction as long side 2AR of reading section 2A, and second side 9 is set nearer to reading section 2A than third side 10. Vertex 7A at which second and third sides 9 and 10 intersect is set between long sides 2AR and 2AL of reading section 2A in the main scanning direction. The color of mark 7 is determined to have a light reflection factor different from that of the remaining portion of the back surface of positioning plate 6, and is set to black, for example.

Figure 6:
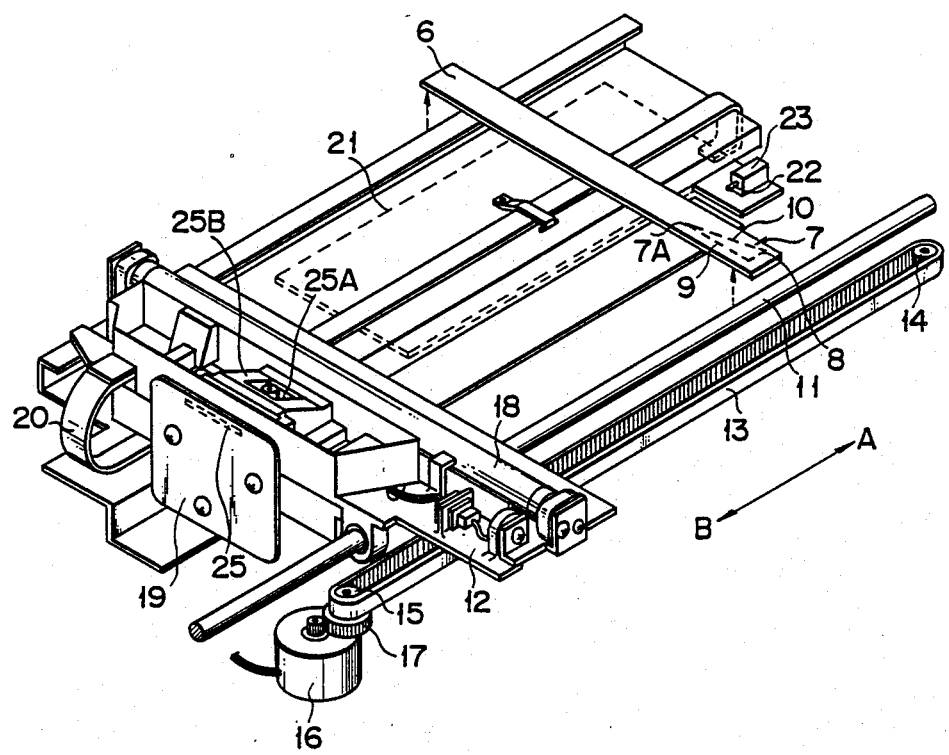
FIG. 6 is a perspective view schematically showing the internal structure of the image reading device of FIG. 4.

FIG. 6 schematically shows the internal construction of the image reading device. The image reading device includes shaft 11, carrier 12, loop-form belt 13, pulleys 14 and 15, motor 16, gear 17, straight tube fluorescent light 18, local circuit board 19, flexible cable 20, main circuit board 21, microswitch 23, CCD image sensor 25, condenser unit 24A and cover 25B. Shaft 11 is placed below original setting board 2 and positioning plate 6, and is formed to extend in the sub-scanning direction. Carrier 12 is fixedly mounted on part of belt 13 which is laid between pulleys 14 and 15 so as to move along shaft 11. Pulley 15 is coupled with motor 16 via gear 17. Carrier 12 is moved backwardly as indicated by arrow A when motor 16 is rotated in a clockwise direction, and is moved forwardly as indicated by arrow B when motor 16 is rotated in a counterclockwise direction.

Image sensor 25 has N light receiving elements arranged in a line, and is supported by means of local circuit board 19. Local circuit board 19, fluorescent light 18, and condenser unit 25A are mounted on carrier 12. Local circuit board 19 is mounted such that the line of the light receiving elements is set in parallel with a line extending in the width direction (or main scanning direction) of reading section 2A, and the first light receiving element is set closer to long side 2AR of reading section 2A than any other element. Light reflected from original 4 and mark 7 is focused onto image sensor 25 by means of condenser unit 25A constituted by a plurality of mirrors and lenses. Cover 25C is used to prevent unwanted light from being incident on condenser unit 25A and image sensor 25. Fluorescent light 18 and local circuit board 19 are connected to main circuit board 21 via flexible cable 20. Microswitch 23 is fixed behind positioning plate 8 as viewed from original table 2. Microswitch 23 has actuator 22 which is depressed by carrier 12 when it is moved backwardly.

FIG. 7 shows the circuit of the image reading device. The circuit of the image reading device includes driving circuit 24 for image sensor 25, amplifier 26, A/D converter 27, digital processing circuit 28, CPU 29, direct memory access controller (DMAC) 30, ROM 31, RAM 32, interface 33, driving circuit 34 for fluorescent light 18, driving circuit 35 for stepping motor 16, and starting switch 36. Digital processing circuit 28 is connected to DMAC 30 via control bus CB and data bus DB. CPU 29, DMAC 30, ROM 31, RAM 32 and interface 33 are connected to one another via address bus AB, data bus DB and control bus CB. Driving circuit 24, image sensor 25, amplifier 26 and A/D converter 27 are formed on local circuit board 19, and digital processing circuit 28, CPU 29, DMAC 30, ROM 31, RAM 32 and interface 33 are formed on main circuit board 21. ROM 31 is used to store a control program for CPU 29. The control program is read out and executed by mean of CPU 29 after the power source is turned on. Input/output data of CPU 29 is temporarily stored in RAM 32. RAM 32 includes image memory area IM for storing picture element data for each scanning position and register area RM for storing items of numeral data used to determine the reading starting position in the main scanning direction and sub-scanning direction. Digital processing circuit 28 is used to perform various image processings, for example, of DPI conversion, gamma correction, and dither processing. Starting switch 36 is connected to CPU 29 to generate a command for starting the original reading operation, and microswitch 23 is connected to CPU 29 to inform that carrier 12 is moved to pass positioning plate 6 in the backward direction. Driving circuits 24, 34, and 35 are each controlled in the image reading process by means of CPU 29. Image sensor 25 is activated in the image reading operation at an interval at which carrier 12 is moved by a preset distance, and it serially outputs N items of picture element data derived from the line of the light receiving elements in the same manner as the prior art technique. Each picture element data is amplified by amplifier 26, converted into a digital signal by A/D converter 27, and then processed by digital processing circuit 28. Each processed picture element data is output from digital processing circuit 28 along with a transfer request for DMAC 30. DMAC 30 is used to store required items of the picture element data output from digital processing circuit 28 into image memory area IM of RAM 32 in each reading cycle. Interface 33 is used to transfer the readout data stored in RAM 32 to an external computer.

Figure 8:
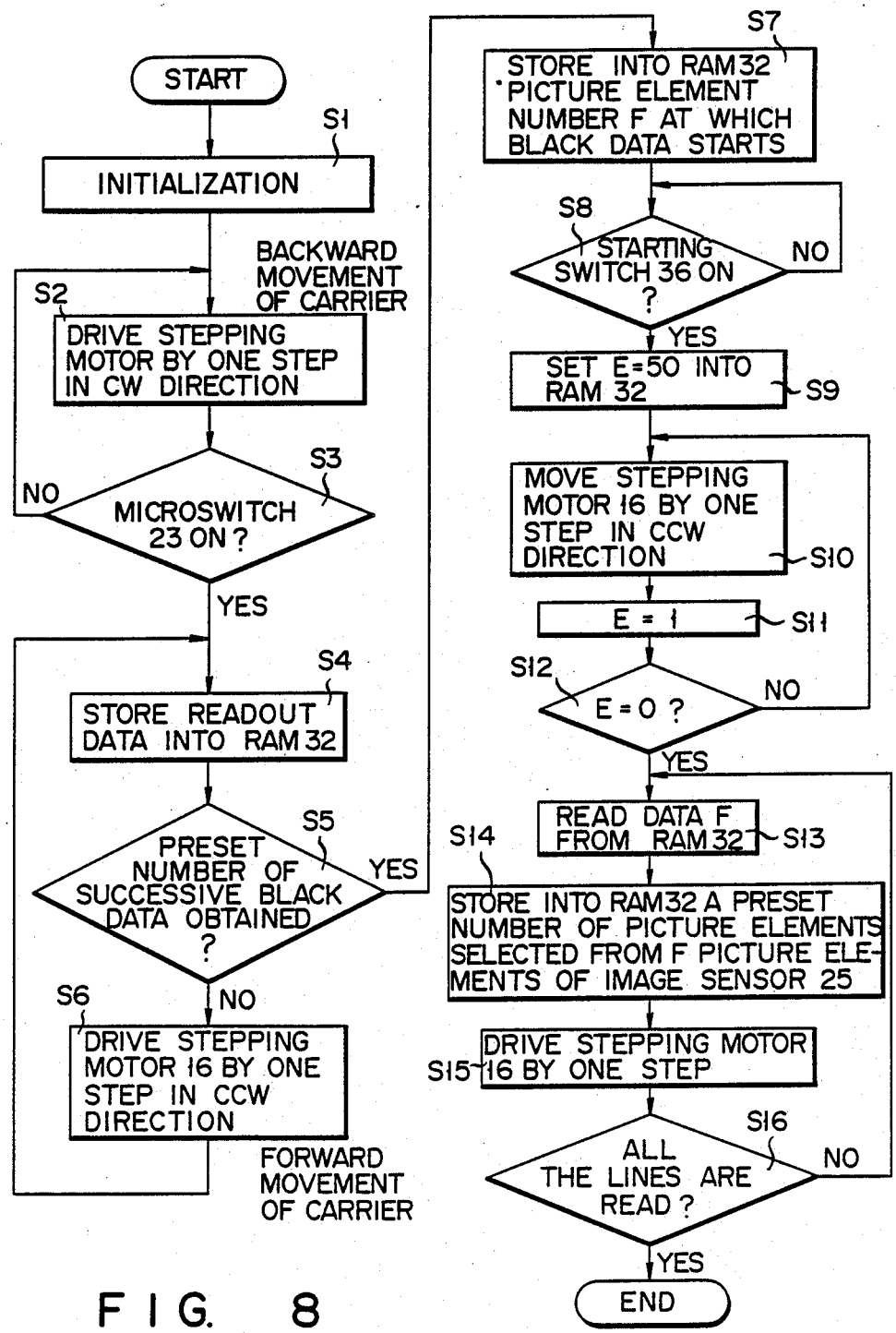
FIG. 8 is a flowchart showing the operation of the circuit shown in FIG. 7.

Now, the operation of the image reading device is explained with reference to FIG. 8. When the power source of the image reading device is turned on, the control program is read out from ROM 31 and executed by CPU 29. As a result, the operation shown in FIG. 8 is started. When the operation of FIG. 8 is started, an initializing process is effected to set the various circuits to initial conditions in step S1. Than, stepping motor 16 is rotated by one step in the clockwise direction to move carrier 12 backwardly by one pitch in step S2. After this, it is checked in step S3 whether microswitch 23 is turned on or not. Steps S2 and S3 are repeatedly effected until microswtich 23 is detected to be turned on. Microswitch 23 is turned on when carrier 12 is moved back so as to come into contact with and depress actuator 22. When it is detected in step S3 that microswitch 23 is turned on, the image reading process is effected in step S4. In the image reading process, image sensor 25 reads the image of one line by use of N light receiving elements under the illumination of fluorescent light 18. Picture element data obtained by the light receiving elements are sequentially supplied from image sensor 25 in an order determined by the numbers of the respective light receiving elements. Each of the picture element data is supplied to digital processing circuit 28 via amplifier 26 and A/D converter 27 and is sequentially subjected to the various image processings. DMAC 30 stores N picture element data output from digital processing circuit 28 into image memory area IM of RAM 32. After this, it is checked in step S5 whether or not successive black picture element data of a preset number corresponding to half the length of side 9, for example, is included in the N picture element data stored in image memory area IM. If it is not detected in step S5 that the preset numer of successive black picture element data is included in the N picture element data, step motor 16 is rotated by one step in the counterclockwise direction in step S6 to move carrier 12 forwardly by one pitch. After this, step S4 is effected again. In this way, carrier 12 is continuously moved forwardly until the preset number of successive black picture element data is detected. The preset number of successive black picture element data is detected when image sensor 25 is moved according to the movement of carrier 12 and reaches substantially the central portion of mark 7. When the preset number of successive black picture element data is detected, step S7 is effected. In step S7, numeral data F is stored into register area RM of RAM 32. Numeral data F is determined by the number of the light receiving element which is included in the successive light receiving elements producing the preset number of successive black picture element data and corresponds to side 8 of mark 7. After this, it is checked in step S8 whether starting switch 36 is operated or not. If starting switch 36 is detected to be operated in step S8, numeral data E is stored into register area RM of RAM 32. Numeral data E is determined according to the number of steps of step motor 16 which is required to advance carrier 12 by distance L equal to the interval between image sensor 25 and reading section 2A, and is set to 50, for example. Then, step motor 16 is rotated in the counterclockwise direction by one step in step S10. At this time, numeral data E is decreased by "1" in step S10 and it is checked in step S11 whether or not numeral data E becomes equal to "0". Steps S10, S11 and S12 are repeatedly effected until carrier 12 is advanced by distance L. Image sensor 25 is set to the reading starting position in the sub-scanning direction when carrier 12 is advanced by distance L. When it is detected in step S12 that numeral data E is equal to "0", the image reading process is effected in step S13. In the image reading process, numeral data F is read out from RAM 32 and set as position data representing the reading starting position in the main scanning direction into DMAC 30, and image sensor 25 reads the image of one line by use of the N light receiving elements under the illumination of fluorescent light 18. Picture element data obtained by the light receiving elements are sequentially supplied from image sensor 25 in an order determined by the numbers of the reseptive light receiving elements. Each of the picture element data is supplied to digital processing circuit 28 via amplifier 26 and A/D converter 27 and is sequentially subjected to the various image processings. At this time, DMAC 30 sequentially specifies picture element data of a predetermined number corresponding to the width of reading section 2A starting from the reading starting position so as to store the predetermined number of picture element data output from digital processing circuit 28 into image memory area IM of RAM 32. In step S15, step motor 16 is rotated by one step in the counterclockwise direction to advance carrier 12 by one pitch, and it is checked in step S16 whether or not the image of the last line is read. Steps S13, S14, S15 and S16 are repeatedly effected until carrier 12 is advanced by distance L equal to the length of reading section 2A.

Figure 9A:
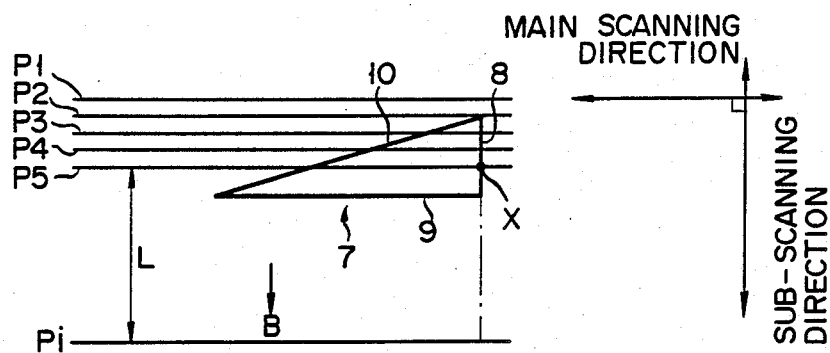
FIGS. 9A to 9C are diagrams showing the operation of detecting the mark shown in FIG. 5.
Figure 9B:
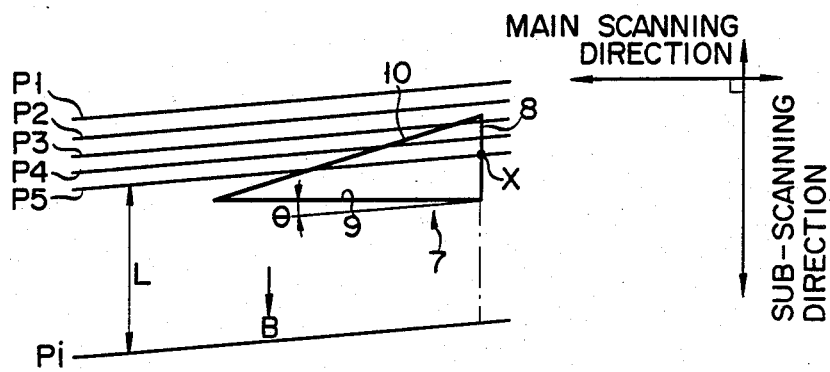
Figure 9C:
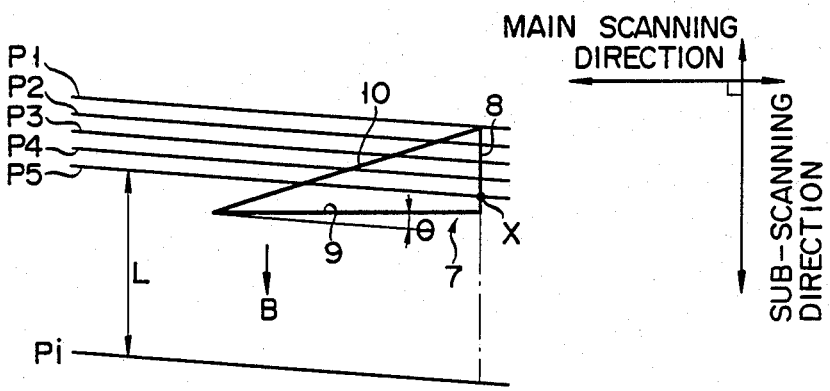

FIG. 9A shows the operation of detecting mark 7 in the case where main scanning lines P1, P2, P3, - - - are set in parallel with the main scanning direction, and FIGS. 9B and 9C show the operation of detecting mark 7 in the case where main scanning lines P1, P2, P3, - - - are not set in parallel with the main scanning direction.

In the above image reading device, each main scanning line intersects with side 8 of mark 7 in a range equal to the length of side 8 after image sensor 25 is moved by carrier 12 and has reached mark 7. Therefore, when it is assumed that a preset number of successive black picture element data can be detected on main scanning line P5, for example, the reading starting position in the main scanning direction can always be set by using as a reference the light receiving element which detects point X on side 8 shown in FIGS. 9B and 9C unless image sensor 25 is mounted to be extremely inclined.

Further, since side 10 of mark 7 extends from side 8 towards reading section 2A at an angle smaller than that made by side 8 and the main scanning direction, the number of successive black picture element data increases with increase in the distance between image sensor 25 and original setting board 2. In this case, the carrier position obtained when mark 7 is detected will not greatly fluctuate.

In FIGS. 9A to 9C, the position of point X in the sub-scanning direction may vary depending on the inclination angle of main scanning lines P1, P2, P3, - - -, but the difference is normally extremely small and can be neglected.

Mark 7 can be formed not on positioning plate 6 but on the end portion of original setting board 2 in the sub-scanning direction, for example.

Further, mark 7 is not limited to a triangle, and may be a polygon such as a trapezoid if it is formed to have a first side extending in the sub-scanning direction and a second side extending from the first side towards reading section 2A at an angle smaller than that made by the first side and the main scanning direction.

What is claimed is:

1. An image reading device comprising:
    an original table having a surface area defined as a reading section for reading the image of the original;
    a mark positioned adjacent to one end of said original table in the lengthwise direction of the reading section and having a light reflection factor different from that of the surroundings, said mark having a first side extending in a sub-scanning direction which is substantially the same as the lengthwise direction of said reading section and a second side extending from the first side towards said reading section at an angle with respect to the first side smaller than an angle made between the first side and a main scanning direction which is substantially the same as the width direction of said reading section;
    a carrier driven towards said reading section across the mark in the sub-scanning direction;
    illumination means for illuminating the original and mark;
    an image sensor fixed on said carrier and having a plurality of light receiving elements arranged in a line to read the image in the main scanning direction; and
    reading control means for detecting that image data corresponding to the light reflection factor of said mark is output from at least a preset number of successive light receiving elements while said image sensor is being moved by the movement of said carrier to pass across said mark, and setting the reading starting position in the main scanning direction by using, as a reference position, the position of the light receiving element which corresponds to the second side of said mark and is included in said light receiving elements which output the image data.

2. An image reading device according to claim 1, wherein said reading control means includes means for setting the reading starting position in the sub-scanning direction by using the position of the image sensor as a reference position when it is detected that said image data corresponding to the light reflection factor of said mark is output from said preset number of successive light receiving elements.

3. An image reading device according to claim 1, wherein said mark is formed of a triangle having said first and second sides.

4. An image reading device according to claim 3, wherein said mark is formed on positioning plate arranged adjacent to one end of said original table.

5. An image reading device according to claim 4, wherein the first side of said mark is placed in the same position in said main scanning direction as one side of said reading section.

6. An image reading device according to claim 5, wherein said reading control means includes means for setting the reading starting position in the sub-scanning direction by using the position of the image sensor as a reference position when it is detected that said image data corresponding to the light reflection factor of said mark is output from said preset number of successive light receiving elements.

* * * * *